US012791428B2

(12) United States Patent
Williams

(10) Patent No.: US 12,791,428 B2
(45) Date of Patent: Nov. 10, 2026

(54) BIDIRECTIONAL OPTICAL POWER MONITOR

(71) Applicant: II-VI Delaware, Inc., Wilmington, DE (US)

(72) Inventor: Martin R. Williams, Big Flats, NY (US)

(73) Assignee: II-VI DELAWARE, INC., Wilmington, DE (US)

( * ) Notice: Subject to any disclaimer, the term of this patent is extended or adjusted under 35 U.S.C. 154(b) by 302 days.

(21) Appl. No.: 18/121,641

(22) Filed: Mar. 15, 2023

(65) Prior Publication Data

US 2024/0310242 A1 Sep. 19, 2024

(51) Int. Cl.

*H04B 10/079* (2013.01)
*G01M 11/00* (2006.01)
*G02B 3/00* (2006.01)
*G02B 17/08* (2006.01)

(52) U.S. Cl.

CPC ........... *G01M 11/30* (2013.01); *G02B 3/0087* (2013.01); *G02B 17/0876* (2013.01); *H04B 10/0795* (2013.01); *H04B 10/07955* (2013.01); *H04B 10/0797* (2013.01)

(58) Field of Classification Search

CPC ........ H04B 10/07–0799; H04B 10/393; H04B 10/564; H04B 10/0795; H04B 10/07955
USPC ....................................... 398/9–38, 107, 177
See application file for complete search history.

(56) References Cited

U.S. PATENT DOCUMENTS

| | | | | |
|---|---|---|---|---|
| 6,603,906 B2 * | 8/2003 | Qin | G02B 6/4204 385/48 |
| 7,333,693 B2 * | 2/2008 | Nagata | G02B 6/2937 385/33 |
| 8,664,584 B2 * | 3/2014 | Yang | G02B 6/4207 385/88 |
| 9,621,264 B2 | 4/2017 | Jiang | |
| 9,735,870 B2 | 8/2017 | Fung et al. | |
| 10,416,401 B2 * | 9/2019 | Lee | G02B 6/4214 |
| 10,469,162 B2 * | 11/2019 | Sakurai | G02B 6/4246 |
| 10,809,471 B2 | 10/2020 | Akl-Chedid et al. | |

(Continued)

OTHER PUBLICATIONS

Kobayashi et al: "Performance of a Reflective Erbium-Doped Fiber Amplifier Pumped by a 1480-nm Laser Diode", 1993 OSA Technical Digest Series (Optica Publishing Group, 1993), paper MA2, pp. 88-91 (Year: 1993).*

*Primary Examiner* — Li Liu
(74) *Attorney, Agent, or Firm* — McAndrews, Held & Malloy, Ltd.

(57) ABSTRACT

A bidirectional optical power monitor is disclosed that is used as an in-line monitor along a section of bidirectional optical fiber. The optical power monitor includes a bidirectional assembly of a lensing arrangement with a partially reflective element coupled to an output of the lensing arrangement. The reflective element directs small portions of optical signals propagating in each direction into separate ones of a pair of photodiodes (allowing for simultaneous measurement of power propagating in both directions along an optical fiber). The reflective element directs the majority of the optical signals through the lensing arrangement a second time and thereafter coupled into the proper section of optical fiber such that a continuity of signal propagation direction is maintained.

12 Claims, 4 Drawing Sheets

(56) References Cited

U.S. PATENT DOCUMENTS

| | | | | |
|---|---|---|---|---|
| 2003/0210874 | A1* | 11/2003 | Souda | G02B 6/4226 385/89 |
| 2007/0036491 | A1* | 2/2007 | Suzuki | G02B 6/4204 385/89 |
| 2007/0183716 | A1* | 8/2007 | Suzuki | G02B 6/4286 385/33 |
| 2010/0166370 | A1 | 7/2010 | Cody et al. | |
| 2011/0091155 | A1 | 4/2011 | Yilmaz et al. | |
| 2013/0034328 | A1* | 2/2013 | Galeotti | G02B 6/30 257/E33.073 |
| 2014/0255042 | A1* | 9/2014 | Kaikkonen | H05K 1/0243 398/208 |
| 2016/0240721 | A1* | 8/2016 | Chu | G01J 1/0407 |
| 2018/0329065 | A1* | 11/2018 | Pacala | G01S 7/4865 |
| 2018/0372582 | A1* | 12/2018 | Liu | G02B 6/422 |
| 2020/0304205 | A1* | 9/2020 | Liu | H04B 10/07955 |
| 2023/0268357 | A1* | 8/2023 | Zang | H10F 39/802 257/432 |
| 2024/0275492 | A1* | 8/2024 | Lv | H04B 10/54 |

* cited by examiner

BIDIRECTIONAL OPTICAL POWER MONITOR

TECHNICAL FIELD

Disclosed herein is a type of optical power monitor that is useful for separately (and simultaneously) measuring optical power in signals propagating in both directions along a common optical fiber.

BACKGROUND

Conventional optical power monitors consist of a combination of an out-coupling section of optical fiber and a photodiode. The so-called "tap fiber" typically removes between 1% and 10% of the signal propagating along the main signal path, and directs this small amount of the signal into the photodiode. By knowing the specific optical power percentage associated with the tap fiber, the measurement by the photodiode can be multiplied by the proper factor to find the actual power of the signal propagating along the main signal path. In most cases, the optical tap is used to measure the optical power propagating in a single direction along the core region of an optical fiber. Inasmuch as a majority of conventional optical systems are based upon the use of uni-directional signal paths, the typical optical tap performs well in the measurement of the propagating optical power.

However, a variety of advanced applications are developing where optical signals propagate in both directions along a common optical fiber. A pair of individual optical taps may be used in these applications, with a first optical tap positioned to out-couple a portion of the signal propagating in a first direction (e.g., left-to-right) and a second optical tap positioned to out-couple a portion of the signal propagating the opposite direction (e.g., right-to-left) along the same fiber. The need to use a pair of individual optical taps necessarily requires the use of twice the number of components, increasing size and cost of the optical power measurement system.

SUMMARY OF THE DISCLOSURE

A bidirectional optical power monitor is disclosed that is configured as a single in-line component that is able to simultaneously (and separately) measure the optical power of signals propagating in both directions along a span of optical fiber.

In accordance with the disclosed principles, a bidirectional optical power monitor takes the form of an in-line device that is disposed at a defined "cut" location along an optical fiber. The cut creates a pair of individual fiber sections, defined hereafter as a first fiber section from one side of the defined cut location and a second fiber section from the other side of the defined cut location. Each fiber section thus includes an "end termination" associated with the cut location, where the end terminations of the first and second fiber sections are coupled as separate inputs to the bidirectional optical power monitor. The disclosed power monitor utilizes a pair of optically-isolated photodiodes that are positioned such that a portion of the optical signal propagating in a first direction impinges one photodiode, while a portion of the signal propagating in the other direction is directed into the other photodiode of the pair. The end terminations of the fiber sections are coupled into a lens structure (typically, a graded index (GRIN) lens), with the propagating signals passing through the GRIN lens as individual and spatially separate optical signals. A reflective element is disposed along an output endface of the GRIN lens, with the reflective element configured to allow for a relatively small portion of the signals to pass through (e.g., 1-10%), and re-direct the majority of the optical signals to propagating through the GRIN lens a second time and then be coupled into the proper fiber section so that continuity of the signal path is maintained (i.e., a signal entering from the first section will be directed into the second section and vice versa).

In example embodiments, a dual-core optical capillary may be included as an input element, with a separate fiber section positioned within an associated hollow core of the dual-core capillary.

In various example embodiments, each photodiode is disposed within its own housing element, with an included aperture used to direct the output beam from the GRIN lens into the active region of the photodiode.

In some applications, the disclosed optical power monitor is used in combination with an optical circulator, measuring the separate signals appearing at a "bidirectional port" of the circulator. The disclosed bidirectional optical power monitor may be disposed in proximity to this bidirectional port and function to measure both the optical power exiting the bidirectional port (using the first photodiode) and the optical power entering the bidirectional port (using the second photodiode).

An embodiment of the disclosed bidirectional power monitor may comprise a bidirectional assembly disposed at a defined cut location along the optical fiber, where the cut location forms a first fiber section with a far-end termination at the cut location and a second fiber section with a near-end termination at the cut location. The bidirectional assembly including a lensing arrangement and a partially reflective element. The lensing arrangement is disposed to receive as separate, spaced-apart inputs the far-end termination of the first fiber section and the near-end termination of the second fiber section. The partially reflective element is disposed along an output endface of the lensing arrangement and is configured to allow a minor portion of optical signals propagating through the lensing arrangement to pass through and exit the bidirectional assembly as a pair of free-space optical tap beams. The partially reflective element redirects the remaining, major portion of the propagating signals to pass through the lensing arrangement a second time and be coupled into a proper one of the first and second fiber sections for maintaining continuity of a signal path direction. Also included in the bidirectional power is a pair of optically-isolated photodiodes disposed in alignment with the pair of free-space optical tap beams such that a first photodiode of the pair provides a measurement of optical power for signals exiting along the far-end termination of the first fiber section, and a second photodiode of the pair provides a measurement of the optical power for exiting along the near-end termination of the second fiber section.

Other and further aspects and examples of the disclosed bidirectional tap may become apparent during the course of the following discussion and by reference to the accompanying drawings.

BRIEF DESCRIPTION OF THE DRAWINGS

Referring now to the drawings where like numerals represent like parts in several views.

DETAILED DESCRIPTION

Figure 1:
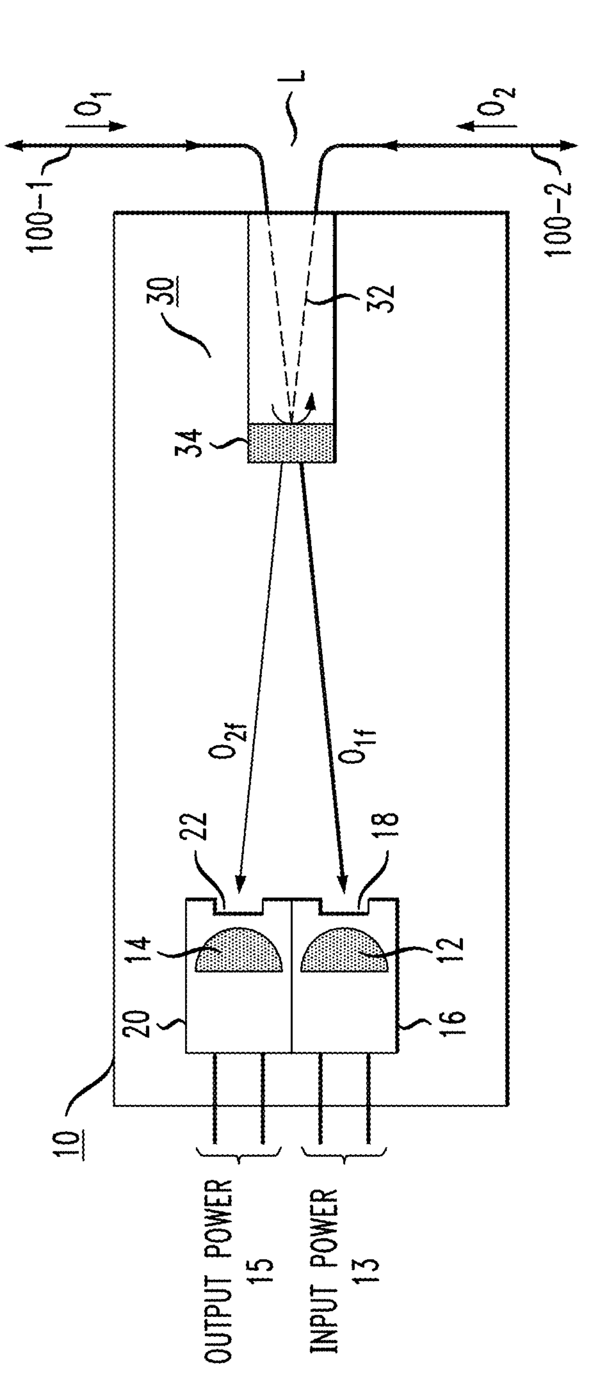
FIG. 1 illustrates one example of a bidirectional optical power monitor in accordance with the present disclosure.

FIG. 1 shows, in diagrammatic form, one example of the disclosed bidirectional optical power monitor 10. Bidirectional optical power monitor 10 is positioned at a defined cut location L along an optical fiber 100 where it is desired to monitor the optical power in the signals propagating in both directions along the fiber. Cut location L thus creates a pair of fiber sections, shown as a first fiber section 100-1 and a second fiber section 100-2. As shown, bidirectional power monitor 10 takes the form of an "in-line" device that maintains the continuity of the signals passing back and forth between sections 100-1 and 100-2 of fiber 100; that is, incoming signals to monitor 10 from fiber section 100-1 (for example) will propagate along fiber section 100-2 upon exiting monitor 10. Similarly, optical signals entering bidirectional power monitor from second fiber section 100-2 will thereafter be directed into first fiber section 100-1 after being reflected within monitor 10. In this manner, continuity of the signal paths is maintained, while providing the ability to separately and simultaneously measure the power in signals propagating in both directions along optical fiber 100.

In form, bidirectional power monitor 10 includes a pair of photodiodes 12 and 14 that are disposed in an optically isolated arrangement, with first photodiode 12 used to measure optical power of a signal propagating in a first direction along optical fiber 100 (e.g., exiting along an end termination of first fiber section 100-1) and second photodiode 14 measuring the optical power in a signal propagating in an opposite direction along optical fiber 100 (e.g., exiting along an end termination of second fiber section 100-2). In this particular embodiment, first photodiode 12 is disposed within a first housing 16 that includes an aperture 18 in optical alignment with first photodiode 12. Similarly, second photodiode 14 is disposed within a second housing 20 that includes an aperture 22 in optical alignment with second photodiode 14. The photodiodes include active opto-electronic material that converts an optical signal irradiating the surface into an electrical representation of the optical signal's power level. The use of separate housings and separate apertures form an optically-isolated arrangement that minimizes the possibility of crosstalk between the signals impinging the pair of photodiodes.

Bidirectional optical monitor 10 is shown in FIG. 1 as also including a bidirectional assembly 30 that is coupled to sections 100-1 and 100-2 of bidirectional optical fiber 100 in a manner that maintains optical signal path continuity in the manner described above. A lensing arrangement 32 (e.g., a graded index (GRIN) lens or similar device, and referred to hereafter as "GRIN lens 32" for convenience) is disposed within bidirectional assembly 30 and positioned such that the optical signals propagating along fiber sections 100-1 and 100-2 are introduced into GRIN lens 32. A partially reflective element 34 is disposed along the opposing endface of GRIN lens 32. Element 34 is configured to reflect a major portion of the optical signals reaching the output of GRIN lens 32, allowing only a fraction of the optical power in the signals to pass through. For example, a reflectivity in the range of about 90-99% may be used to form partially reflective element 34, allowing only a small fraction of the signal (referred to at times as the "tap light") to pass through.

A curved arrow is included in FIG. 1 to illustrate the redirection of the reflected portion of the propagating beams upon encountering reflective element 34. As mentioned above, reflective element 34 is configured to allow for a small percentage (referred to as a "minor portion") of the propagating signals to pass through, exiting bidirectional assembly 30 and thereafter propagating as free-space beams (denoted $O_{1f}$ and $O_{2f}$) toward photodiodes 12, 14, respectively. In the particular arrangement of FIG. 1, optical signal $O_{1f}$ is shown as directed into first photodiode 12 and optical signal $O_{2f}$ is shown as directed into second photodiode 14. The properties of GRIN lens 32, as well as the positioning of photodiodes 12, 14, are controlled in a known manner to ensure that the pair of free-space beams $O_{1f}$, $O_{2f}$ directly impinge the photodiodes for optimum optical coupling efficiency. The impinging optical signals are converted into electrical representations within photodiodes 12, 14 and exit bidirectional power monitor 10 along individual electrical signal paths 13 and 15, respectively. These electrical signals may then be used in a manner well known in the art to determine the optical power in each propagating signal, shown as "input power" (associated with free-space beam $O_{1f}$) and "output power" (associated with free-space beam $O_{2f}$).

As a result of using GRIN lens 32 in combination with the optically-isolated pair of photodiodes 12 and 14, bidirectional power monitor 10 is able to simultaneously measure the optical power in signals propagating in each direction along optical fiber 100, in accordance with the principles of the present disclosure.

In order to maintain continuity of signal propagation direction along optical fiber 100, the properties of GRIN lens 32 are such that an optical signal entering along first fiber section 100-1 will be redirected into second fiber section 100-2 (and vice versa), thus maintaining continuity of the optical signal path direction through optical power monitor 10. The spatial separation between the propagating beams is one factor in ensuring that the optical signal $O_{1f}$ exiting fiber section 100-1 is directed into first photodiode 12 and the optical signal Of2 exiting fiber section 100-2 is directed into second photodiode 14.

Figure 2:
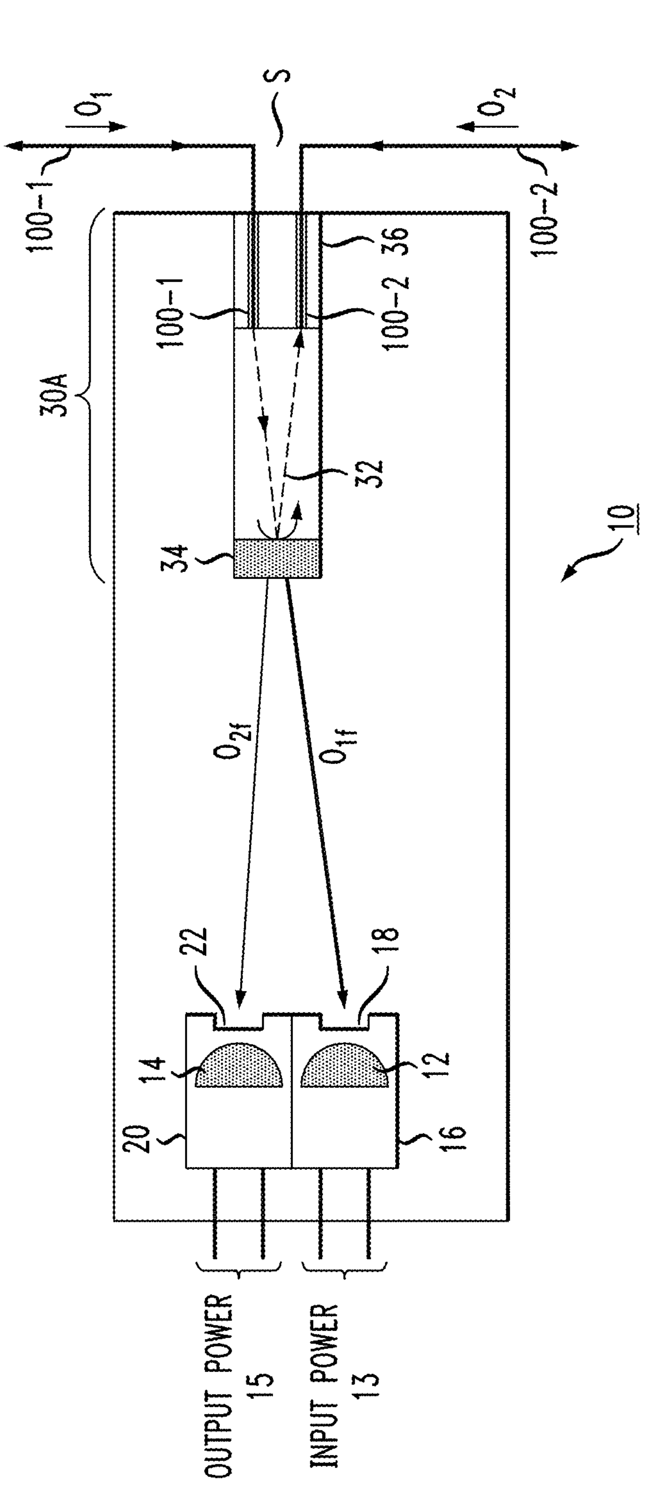
FIG. 2 illustrates another example of the disclosed bidirectional optical power monitor.

FIG. 2 illustrates another example of the disclosed bidirectional optical power monitor. Here, an alternative bidirectional assembly 30A is shown that includes a dual-core capillary 36 disposed along an input endface of GRIN lens 32 and positioned to support optical fiber sections 100-1 and 100-2 (again, these fiber sections created at a cut location L along optical fiber 100 so that bidirectional power monitor 10A may be used as an in-line device). Dual-core capillary 36 is formed to include a pair of hollow cores, allowing the fiber sections to remain in a parallel relationship with a fixed spacing as they reach GRIN lens 32. The inclusion of capillary 36 is only one example of maintaining a spatial separation between fiber sections 100-1, 100-2 along the input face of GRIN lens 32. Other arrangements (fiber ferrules, for example) may be used to ensure the spaced-apart positioning of fiber sections 100-1, 100-2 along the endface of GRIN lens 32.

Figure 3:
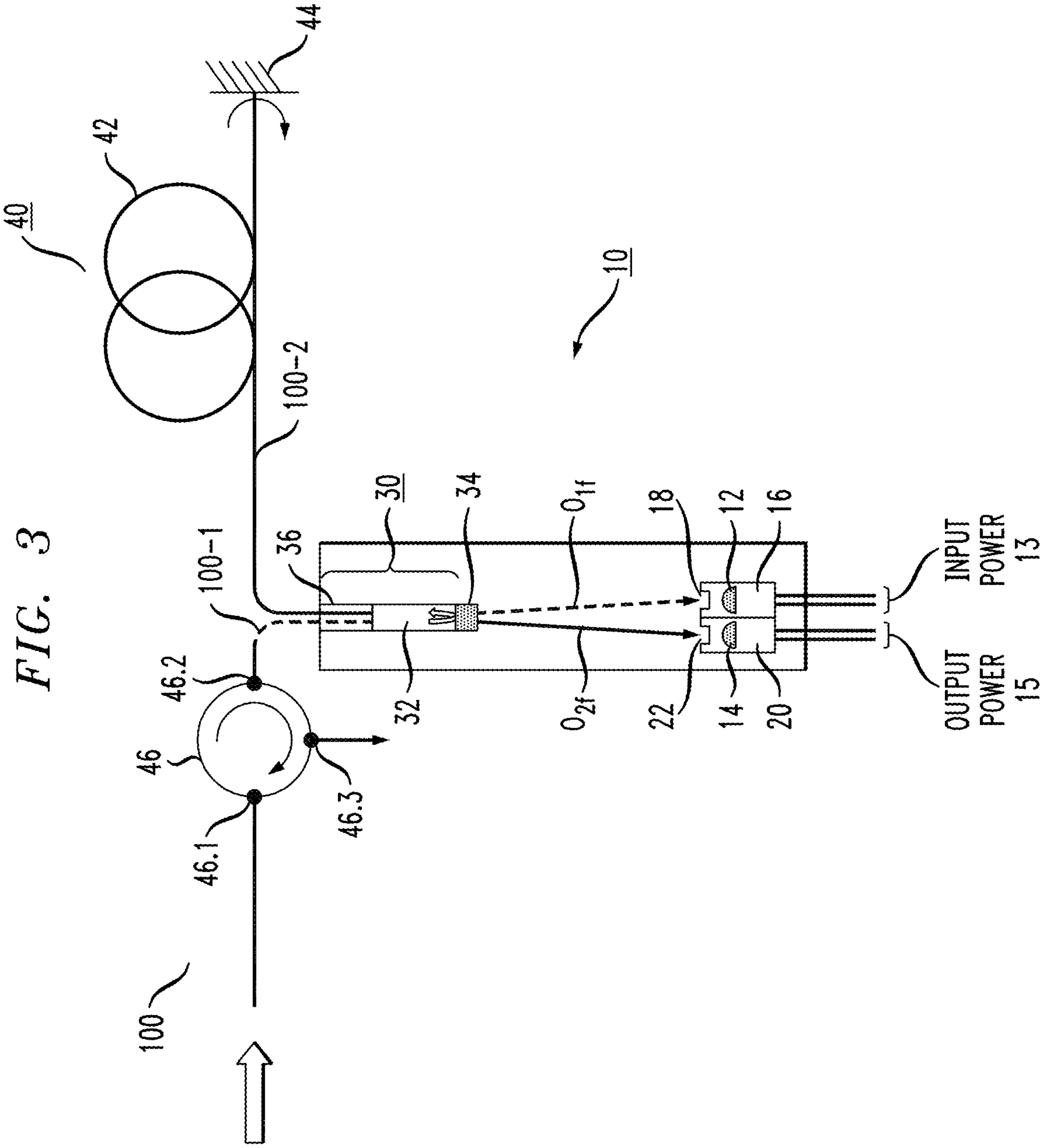
FIG. 3 illustrates the use of the example bidirectional optical power monitor of FIG. 2 in an optical system.

FIG. 3 illustrates the example bidirectional power monitor 10 of FIG. 2 as used in combination with a reflective optical amplifier 40. Briefly, optical amplifier 40 comprises a section of rare-earth doped optical fiber 42 through which an optical input signal may pass and be amplified by the presence of pump light at a suitable wavelength. A reflective element 44 is disposed at a far-end termination of doped optical fiber 42, and is used to re-direct the initially-amplified optical signal to pass through fiber 42 a second time and be further amplified. Also included in this particular amplifier arrangement is an optical circulator 46 that is used to direct the propagation of the signals into and out of fiber 42. The initial optical input signal is introduced at input port 46.1 of circulator 46 and passes through the circulator to exit at a bidirectional port 46.2, where the signal is then coupled into doped fiber 42. The twice-amplified optical signal exits this same termination of doped fiber 42 and is applied as an input to bidirectional port 46.2 of circulator 46. The amplified signal passes through optical circulator 46, exiting at output port 46.3.

Continuing with reference to FIG. 3, bidirectional power monitor 10 is shown as disposed in proximity to bidirectional port 46.2, with a near-end termination of first fiber section 100-1 coupled to bidirectional port 46.2 and a far-end termination of second fiber section 100-2 coupled to doped fiber 42 of amplifier 40. In this arrangement, first fiber section 100-1 may direct the original input signal into bidirectional power monitor 10, with a small (minor) fraction $O_{1f}$ passing through reflective element 34 and reaches first photodiode 12 in the same manner as discussed above. The measurement performed by first photodiode 12 is thus an indication of the input power level. The majority of the input signal is redirected by reflective element 34 and passes through GRIN lens 32 so as to couple into second fiber section 100-2 toward doped fiber 42. As described above, the input signal passes through doped fiber 42 twice (back and forth) as it is redirected by reflective element 44 (100% reflective) located at the far-end of doped fiber 42. The twice-amplified signal will continue to propagate along second fiber section 100-2 back toward bidirectional optical power monitor 10.

In particular, second fiber section 100-2 directs the amplified signal through dual-core capillary 36, coupling the amplified bean into GRIN lens 32. In this case, reflective element 34 directs a small (minor) portion of the amplified signal $O_{2f}$ into second photodiode 14. The measurement performed by photodiode 14 is therefore an indication of the output power level, and the measurements performed by the pair of photodiodes may be used to calculate the amount of gain generated within amplifier 40. The majority of the amplified signal that is redirected by reflective element 34 passes a second time through GRIN lens 32 and is coupled into first fiber section 100-1. The amplified signal then propagates along fiber section 100-1 and is coupled into bidirectional port 46.2 of optical circulator 46. The amplified signal propagates through circulator 46 and exits along output port 46.3, as shown.

Figure 4:
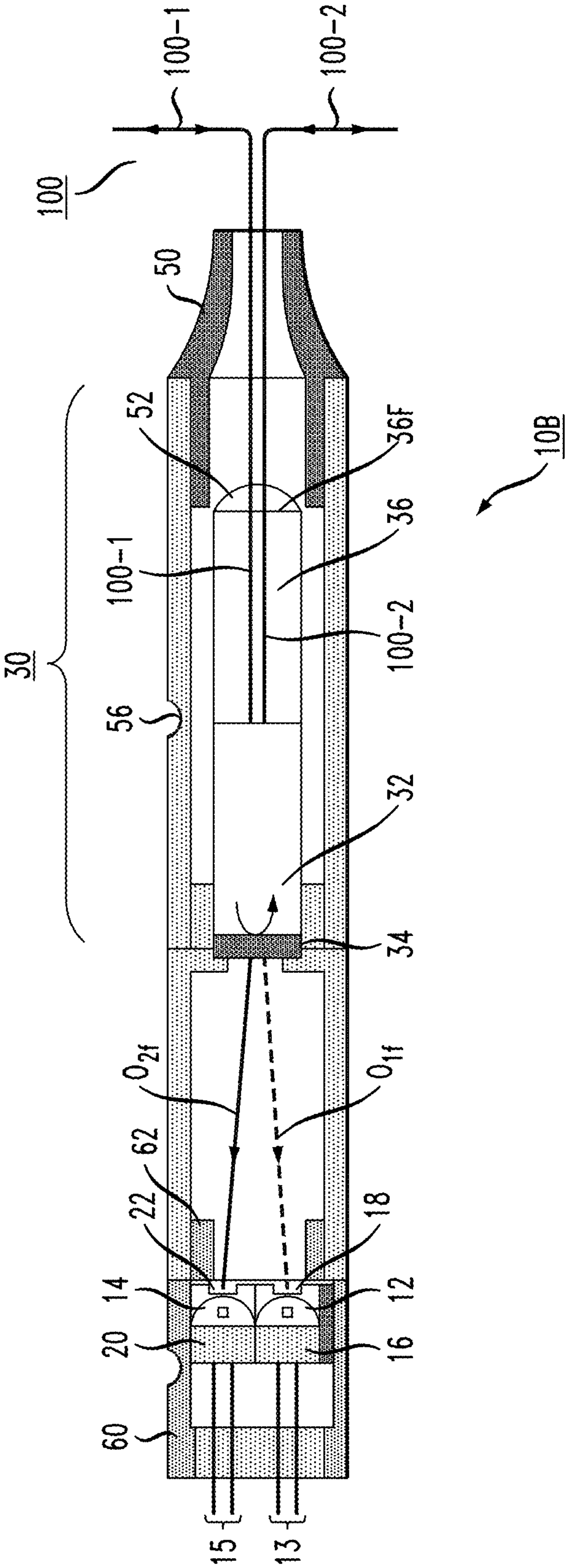
FIG. 4 depicts in more detail one arrangement of components that may be used to form the disclosed bidirectional optical power monitor.

FIG. 4 includes a detailed illustration of bidirectional power monitor 10, showing example housing elements that may be used. In this example, a strain-relief collar 50 is shown as surrounding the portions of fiber sections 100-1, 100-2 that exit power monitor 10. Extreme movements of bidirectional power monitor 10 with respect to fiber 100 may result in the pair of fiber sections being bent/curved to the point where some of the propagating light may be directed out of the fiber, introducing unwanted power loss into the system. The inclusion of strain-relief collar 50 functions to absorb movements along fiber sections 100-1, 100-2 and minimizes unwanted bending loss along the fibers. An epoxy 52 is shown as covering a front endface 36F of capillary 36, where epoxy 52 is used to ensure that fiber sections 100-1, 100-2 do not become dislodged or separated from capillary 36. All of these components forming bidirectional assembly 30 are shown in FIG. 4 as assembled within a "pipe" housing 56 of bidirectional power monitor 10.

A second housing 60 is shown in FIG. 4 as used to support photodiodes 12, 14. In this particular example, housing 60 is shown as comprising a collar termination 62 that is sized to snugly fit within the inner diameter of pipe housing 56. First photodiode housing 16 and second photodiode housing 20 are shown as attached to the opposing end of housing 60 and positioned such that photodiodes 12, 14 are aligned to receive incoming optical signals $O_{1f}$ and $O_{2f}$, respectively.

The particular configuration of the disclosed bidirectional power monitor as shown in FIG. 4 is considered to be just one example of elements that may be used to provide the desired measurements of optical signals propagating in both directions along an optical fiber. Various modifications, changes, and adaptations may be apparent from the foregoing description without undue experimentation and without departing from the spirit and scope of the disclosure as defined in the following claims.

What is claimed is:

1. An optical power monitor for use with an optical fiber supporting bidirectional signal propagation, the optical power monitor comprising:

a bidirectional assembly disposed at a defined cut location along the optical fiber, the cut location forming a first fiber section with a far-end termination at the cut location and a second fiber section with a near-end termination at the cut location, the bidirectional assembly including:

a lensing arrangement disposed to receive as separate, spaced-apart inputs the far-end termination of the first fiber section and the near-end termination of the second fiber section; and a partially reflective element disposed along an output endface of the lensing arrangement, the partially reflective element configured to allow a minor portion of optical signals propagating through the lensing arrangement to pass through and exit the bidirectional assembly as a pair of free-space optical tap beams, the partially reflective element redirecting a remaining, major portion of the propagating signals to pass through the lensing arrangement a second time and be coupled into a proper one of the first and second fiber sections for maintaining continuity of a signal path direction;

a first photodiode housing comprising a first photodiode housing aperture;

a first photodiode in the first photodiode housing, wherein the first photodiode comprises a first active region in optical alignment with the first photodiode housing aperture;

a second photodiode housing comprising a second photodiode housing aperture; and a second photodiode in the second photodiode housing, wherein the second photodiode comprises a second active region in optical alignment with the second photodiode housing aperture;

wherein positioning of the first photodiode housing and the first photodiode housing aperture and positioning of the second photodiode housing and the second photodiode housing aperture in relation to the lensing arrangement ensures that a first free-space optical tap beam and a second free-space optical tap beam of the pair of free-space optical tap beams respectively passes through the first photodiode housing aperture and the second photodiode housing aperture and not respectively through the second photodiode housing aperture and the first photodiode housing aperture so as to optically-isolate and reduce cross-talk between the first free-space optical tap beam and the second free-space optical tap beam;

wherein the first photodiode provides, based on the first free-space optical tap beam, a measurement of optical power for signals exiting along the far-end termination of the first fiber section;

wherein the second photodiode provides, based on the second free-space optical tap beam, a measurement of the optical power for signals exiting along the near-end termination of the second fiber section;

wherein a near-end termination of the first fiber section is coupled to a bidirectional port of an optical circulator;

wherein a far-end termination of the second fiber section is coupled to a reflective element for redirecting a propagating signal to propagate in a reverse direction along the second fiber section and pass a second time through the optical power monitor prior to being coupled into a directional port of the optical circulator, the optical power monitor providing a measure of optical input power at the first photodiode and a measure of optical output power at the second photodiode; and wherein at least a portion of the second fiber section comprises a length of rare-earth doped optical fiber also responsive to an optical pump beam so as to form an optical amplifier.

2. The optical power monitor of claim 1, wherein the minor portion of the optical signals passing through the partially reflective element is in a range of about 1%-10% of the optical power, and the major portion redirected through the lensing arrangement a second time in a range of about 99%-90%, in conjunction with the minor portion range.

3. The optical power monitor of claim 1, wherein the lensing arrangement comprises a graded index (GRIN) lens.

4. The optical power monitor of claim 3, wherein the far-end termination of the first fiber section and the near-end termination of the second fiber section direct optical signals into an input endface of the GRIN lens.

5. The optical power monitor of claim 1, where the bidirectional assembly further comprises:

a dual-core capillary disposed at an input endface to the lensing arrangement;

wherein the dual-core capillary comprises a pair of hollow cores;

wherein each hollow core supports a separate one of the first and second fiber sections;

wherein the first and second fiber sections extends through the hollow cores along a longitudinal extent of the dual-core capillary; and wherein an output endface of the dual-core capillary is disposed adjacent to the lensing arrangement, providing optical coupling of the far-end termination of the first fiber section and the near-end termination of the second fiber section to the lensing arrangement in a spatially separated position determined by a spacing between the hollow cores.

6. The optical power monitor of claim 5, comprising an epoxy that covers an input endface of the dual-core capillary and secures the far-end termination of the first fiber section and the near-end termination of the second fiber section to the dual-core capillary.

7. The optical power monitor of claim 1, the measured output power being a measure of an amplified optical signal and a ratio of an input optical power and an output optical power defining an optical gain of the optical amplifier.

8. The optical power monitor of claim 1, comprising a strain-relief collar surrounding the first fiber section and the second fiber section.

9. The optical power monitor of claim 1, comprising:

a first assembly housing in which are assembled the lensing arrangement and the partially reflective element; and a second assembly housing in which are assembled the first photodiode housing, the first photodiode, the second photodiode housing, and the second photodiode; and wherein second assembly housing comprises a collar termination sized to engage an inner diameter of the first assembly housing.

10. A method of performing simultaneous power measurements of optical signals propagating in opposing directions along a bidirectional optical fiber, the method comprising the steps of:

inserting an optical power monitor at a defined cut location along the bidirectional optical fiber, the cut location forming a first fiber section with a far-end termination at the cut location and a second fiber section with a near-end termination at the cut location, the optical power monitoring including a lensing arrangement, a partially reflective element disposed along an output endface of the lensing arrangement, and a pair of optically-isolated photodiodes disposed in optical alignment with the partially reflective element;

coupling the far-end termination of the first fiber section to an input endface of the lensing arrangement at a first location;

coupling the near-end termination of the second fiber section to the input endface of the lensing arrangement at a second location spaced apart from the first location;

receiving, at a first photodiode of the pair of optically-isolated photodiodes via a first photodiode housing aperture of a first photodiode housing, a first free-space optical tap beam from the partially reflective element, wherein the first free-space optical tap beam is a minor portion of a first optical signal entering from the far-end termination of the first fiber section;

directing a major portion of the first optical signal from the partially reflective element into the near-end termination of the second fiber section;

receiving, at a second photodiode of the pair of optically-isolated photodiodes via a second photodiode housing aperture of a second photodiode housing, a second free-space optical tap beam from the partially reflective element, wherein the second free-space optical tap beam is a minor portion of a second optical signal entering from the near-end termination of the second fiber section;

directing a major portion of the second optical signal from the partially reflective element into the far-end termination of the first fiber section;

converting the first free-space optical tap beam received by the first photodiode into a first electrical representation of optical power for the major portion of the first optical signal; and converting the second free-space optical tap beam received by the second photodiode into a second electrical representation of optical power for the major portion of the second optical signal; and wherein the first photodiode housing, the first photodiode housing aperture, the second photodiode housing, and the second photodiode housing aperture in conjunction with the lensing arrangement ensures that the first free-space optical tap beam and the second free-space optical tap beam respectively passes through the first photodiode housing aperture and the second photodiode housing aperture and not respectively through the second photodiode housing aperture and the first photodiode housing aperture so as to optically-isolate and reduce cross-talk between the first free-space optical tap beam and the second free-space optical tap beam;

wherein a near-end termination of the first fiber section is coupled to a bidirectional port of an optical circulator;

wherein a far-end termination of the second fiber section is coupled to a reflective element for redirecting the major portion of the first optical signal to propagate in a reverse direction along the second fiber section and pass a second time through the optical power monitor as the second optical signal prior to being coupled into a directional port of the optical circulator, the optical power monitor providing a measure of optical input power at the first photodiode and a measure of optical output power at the second photodiode; and wherein at least a portion of the second fiber section comprises a length of rare-earth doped optical fiber also responsive to an optical pump beam so as to form an optical amplifier.

11. The method as defined in claim 10, comprising:

determining the optical power for the major portion of the first optical signal by multiplying the first electrical representation by a factor related to a defined reflectance percentage of the partially reflective element; and determining the optical power for the major portion of the second optical signal by multiplying the second electrical representation by the factor related to the defined reflectance percentage of the partially reflective element.

12. The method as defined in claim 10, wherein;

the major portion of the first optical signal comprises an input signal directed toward an optical amplifier comprising the reflective element and the length of rare-earth doped optical fiber; and the second optical signal comprises an output amplified signal from the optical amplifier, the method further comprising the step of:

determining an optical gain created in the optical amplifier from a ratio of the first electrical representation and the second electrical representation.

* * * * *